US006874359B2

(12) United States Patent
Shimizu

(10) Patent No.: US 6,874,359 B2
(45) Date of Patent: Apr. 5, 2005

(54) CONTROL APPARATUS AND CONTROL METHOD OF ENGINE

(75) Inventor: Hirokazu Shimizu, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/618,707

(22) Filed: Jul. 15, 2003

(65) Prior Publication Data

US 2004/0011122 A1 Jan. 22, 2004

(30) Foreign Application Priority Data

Jul. 22, 2002 (JP) ....................................... 2002-212974

(51) Int. Cl.$^{7}$ ............................................... G01M 15/00

(52) U.S. Cl. ......................................... 73/117.3; 73/113

(58) Field of Search ........................... 73/112, 113, 116, 73/117.2, 117.3, 118.1, 119 A, 119 R

(56) References Cited

U.S. PATENT DOCUMENTS 5,778,862 A * 7/1998 Fukui ......................... 123/631
5,794,592 A 8/1998 Fukui
6,732,713 B1 * 5/2004 Kanazawa et al. .......... 123/476
2003/0041847 A1 * 3/2003 Shin ........................... 123/631
2003/0106364 A1 * 6/2003 Kimata et al. ............. 73/118.1
2004/0089272 A1 * 5/2004 Kanazawa et al. .......... 123/476

FOREIGN PATENT DOCUMENTS

JP 11-257148 A 9/1999

* cited by examiner

*Primary Examiner*—Eric S. McCall
(74) *Attorney, Agent, or Firm*—Foley & Lardner LLP

(57) ABSTRACT

In a constitution where, when a cam sensor is failed, a present value of cylinder discrimination value is estimated from a previous value to continue a control for each cylinder, if an engine is rotated in reverse at an engine stop and also fuel is burned during the reverse rotation, the control for each cylinder based on the cylinder discrimination value estimated based on the previous value is prohibited.

19 Claims, 10 Drawing Sheets

CONTROL APPARATUS AND CONTROL METHOD OF ENGINE

BACKGROUND

The present invention relates to a technique for setting a cylinder discrimination value for discriminating a cylinder at a reference piston position and controlling fuel injection or ignition for each cylinder based on the cylinder discrimination value, in an internal combustion engine.

Japanese Unexamined Patent Publication No. 11-257148 discloses a method of setting a cylinder discrimination value based on a cylinder discriminating signal output from a cam sensor and controlling fuel injection and ignition for each cylinder based on the cylinder discrimination value.

The cylinder discrimination value is sequentially changed over for each stroke phase difference between cylinders in accordance with ignition order. Therefore, even if the cam sensor is failed, it is possible to estimate a present value from a previous value, following a normal time. As a result, by storing a cylinder discrimination value of immediately before an engine stop, it is possible to start the engine by a control for each cylinder even if the cam sensor has failed.

Unfortunately, if the engine is rotated in reverse immediately before the engine stops (and it becomes necessary to update the timing of cylinder discrimination value due to the reverse rotation), the cylinder discrimination value is improperly updated to a value corresponding to a cylinder of next ignition order in a forward rotation. Further, in the case where cranking is stopped before completion of engine start, the engine is rotated in reverse, and fuel is burned during the reverse rotation, the engine is further rotated. Thus, if the fuel is burned during the reverse rotation resulting in the engine being excessively rotated, the cylinder discrimination value at the engine stop cannot be judged accurately even if the reverse rotation of the engine is detected.

SUMMARY

The present invention has been achieved in view of the above problems and has an object to enable a control for each cylinder from an engine start while avoiding an erroneous control based on an erroneous cylinder discrimination result, when a cam sensor has failed.

To achieve the above object, the present invention is constituted so that, when an engine is rotated in reverse and fuel is burned in the engine during the reverse rotation, a control for each cylinder based on a cylinder discrimination value estimated based on a previous cylinder discrimination value, is prohibited. This and other objects and features of this invention will become apparent from the following description with accompanying drawings.

DETAILED DESCRIPTION

Figure 1:
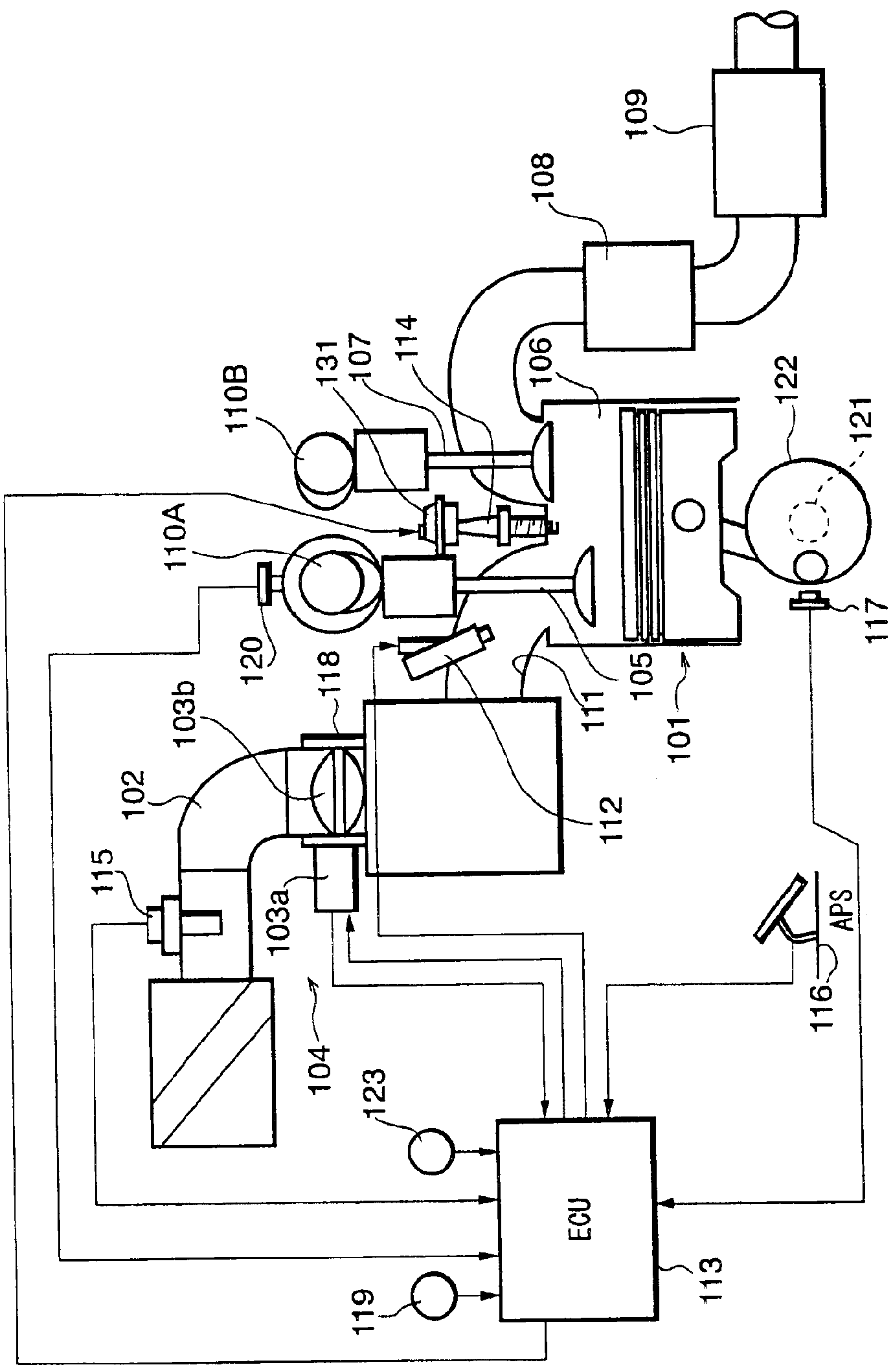
FIG. 1 is a view showing a system structure of an engine in an embodiment of the present invention.

FIG. 1 shows an internal combustion engine in an embodiment of the present invention.

In FIG. 1, an engine 101 is an in-line four-cylinder engine for vehicle.

An intake pipe 102 of engine 101 is disposed with an electronically controlled throttle chamber104 for driving a throttle valve 103*b* to open and close by a throttle motor 103*a*.

Air is sucked into a combustion chamber 106 via electronically controlled throttle chamber 104 and an intake valve 105.

An exhaust gas from engine 101 is discharged from combustion chamber 106 via an exhaust valve 107.

The exhaust gas is purified by a front catalyst 108 and a rear catalyst 109, and then emitted into the atmosphere.

Intake valve 105 and exhaust valve 107 are driven to open/close by cams provided on an intake side camshaft 110A and an exhaust side camshaft 110B.

An electromagnetic type fuel injection valve 112 is disposed to an intake port 111 on an upstream side of intake valve 105 of each cylinder.

Fuel injection valve 112 is driven to open/close by an injection pulse signal output for each cylinder from an engine control unit 113.

In the following description, engine control unit 113 will be abbreviated as ECU 113.

An air-fuel mixture formed in each cylinder is burned by spark ignition by an ignition plug 114.

Each ignition plug 114 is disposed with an ignition coil 131 incorporating therein a power transistor.

ECU 113 performs a switching control of each power transistor, to control independently the ignition timing of each cylinder.

ECU 113 receives detection signals from various sensors.

For the various sensors, the following sensors are disposed:

an accelerator pedal sensor APS 116 detects an accelerator opening;

an air flow meter 115 detects an intake air amount Qa of engine 101;

a crank angle sensor 117 is disposed on a crankshaft 121 and outputs a position signal POS at each unit crank angle;

a throttle sensor 118 detects an opening TVO of throttle valve 103*b;* a water temperature sensor 119 detects a cooling water temperature Tw of engine 101; and a cam sensor 120 is disposed on intake side camshaft 110A and outputs a cylinder discriminating signal PHASE.

Further, ECU 113 receives ON/OFF signals for a starter switch 123.

Cam sensor 120 is a sensor detecting detection objects formed on a periphery of a signal plate axially supported by camshaft 110A, by means of a Hall element or an electromagnetic pick-up.

Camshaft 110A is rotated two revolutions for one revolution of crankshaft 121.

Figure 2:
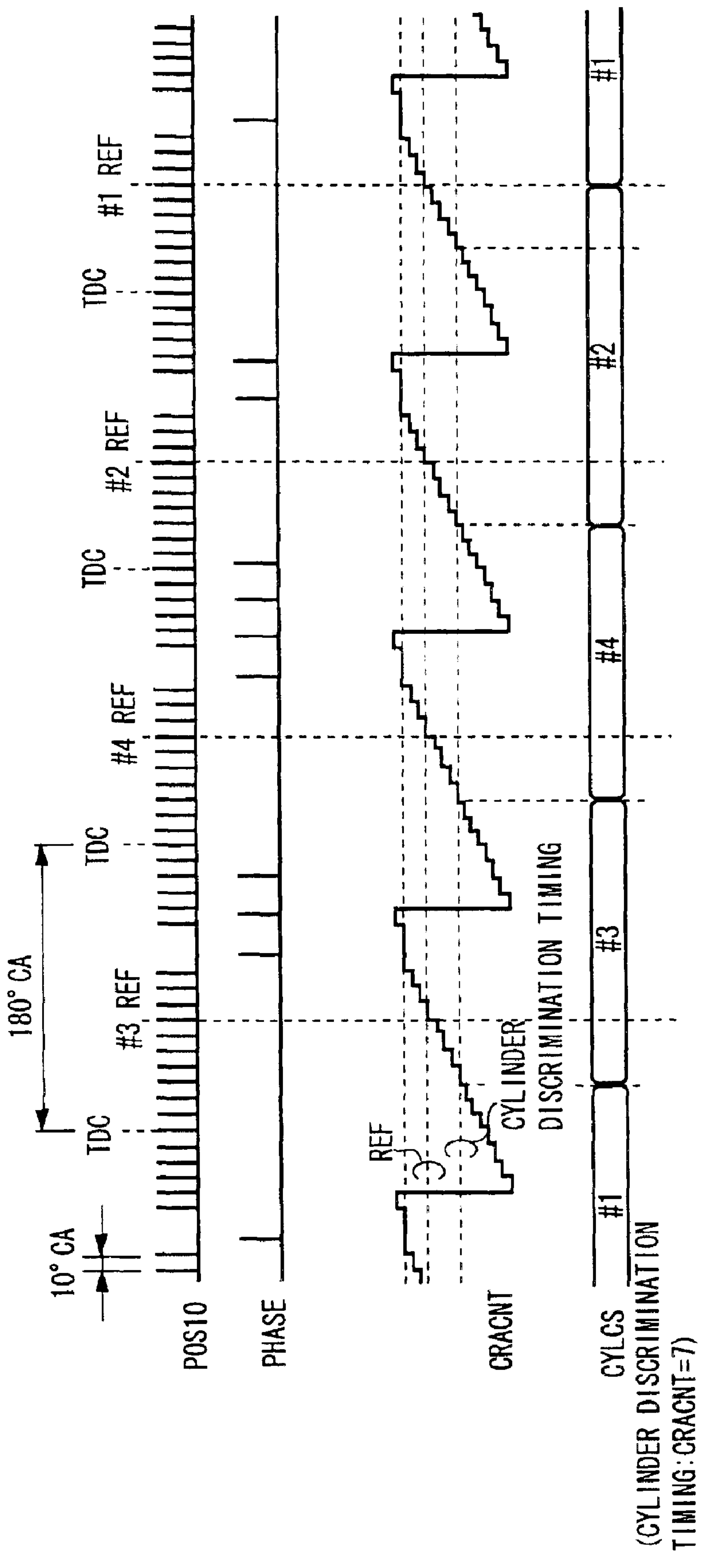
FIG. 2 is a time chart showing output characteristics of a crank angle sensor and a cam sensor in the embodiment of the present invention shown in FIG. 1.

In the present embodiment, the detection objects having the number of angles different from each other are disposed at each 90° on the periphery of the signal plate, so that one through four pulse signals are output as cylinder discriminating signal PHASE at each crank angle 180°, as shown in FIG. 2.

Crank angle 180° corresponds to a stroke phase difference between cylinders in in-line four-cylinder engine 101.

Further, crank angle sensor 117 is a sensor detecting detection objects formed on a periphery of a signal plate 122 axially supported by crankshaft 121 by means of a Hall element or an electromagnetic pick-up.

In the present embodiment, protruding portions are formed at each crank angle 10° on the periphery of signal plate 122, so that crank angle sensor 117 outputs position signal POS at each crank angle 10° CA, as shown in FIG. 2.

Further, for the protruding portions to be formed on the periphery of signal plate 122, at positions corresponding to BTDC 60° and BTDC 70° of each cylinder, such protruding portions are not formed.

Thus, as shown in FIG. 2, position signal POS is not generated consecutively twice at each 180°.

Further, as shown in FIG. 2, a leading pulse position of cylinder discriminating signal PHASE output at each crank angle 180° CA and a position of no position signal POS are aligned with each other.

In the constitution described above, ECU 113 generates a reference crank angle signal REF, based on signals from cam sensor 120 and crank angle sensor 117, and performs cylinder discrimination for corresponding reference crank angle signal REF to each cylinder.

Then, ECU 113 controls ignition timing and fuel injection timing of each cylinder on the basis of reference crank angle signal REF.

There will be described the details of generation of reference crank angle signal REF and of cylinder discrimination in accordance with flowcharts of FIG. 3 to FIG. 9.

Figure 3:
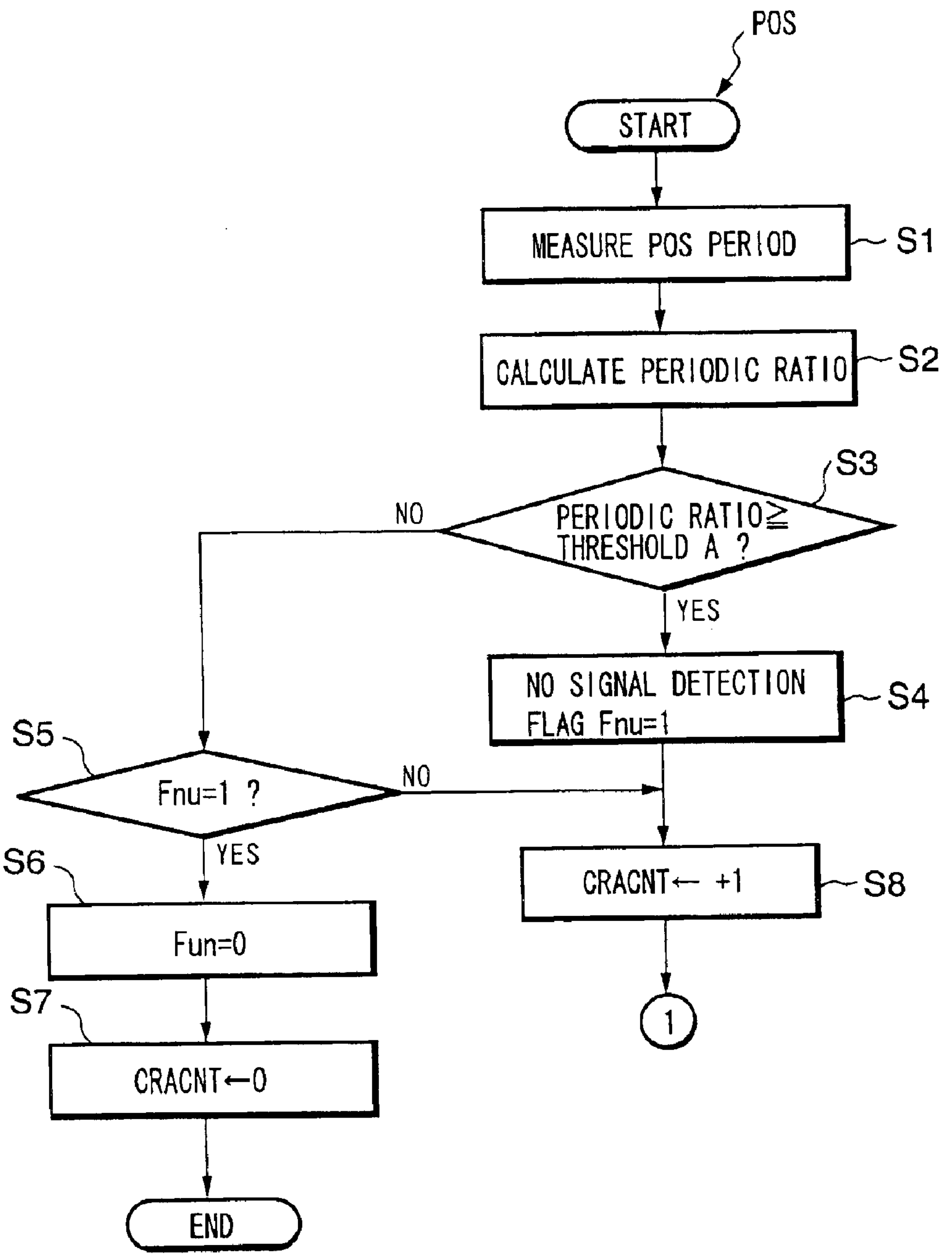
FIG. 3 is a flowchart showing a cylinder discrimination process in the embodiment of the present invention shown in FIG. 1.
Figure 4:
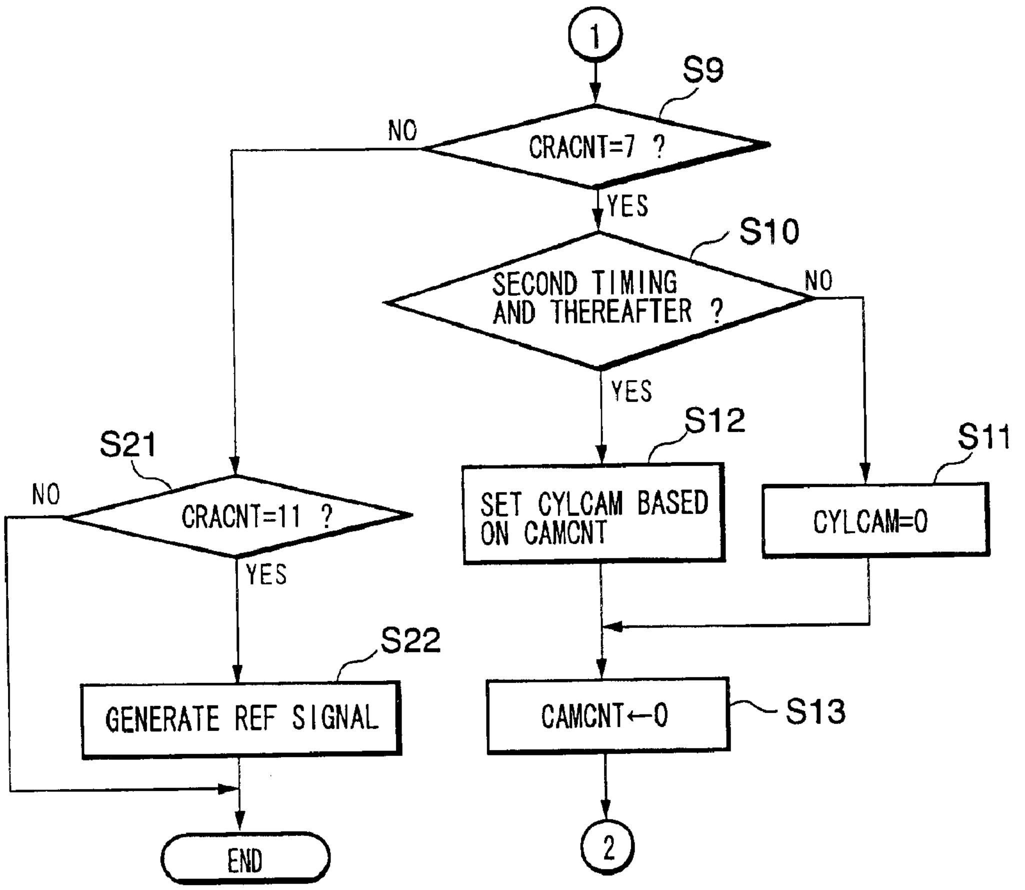
FIG. 4 is a flowchart showing a cylinder discrimination process in the embodiment of the present invention shown in FIG. 1.
Figure 5:
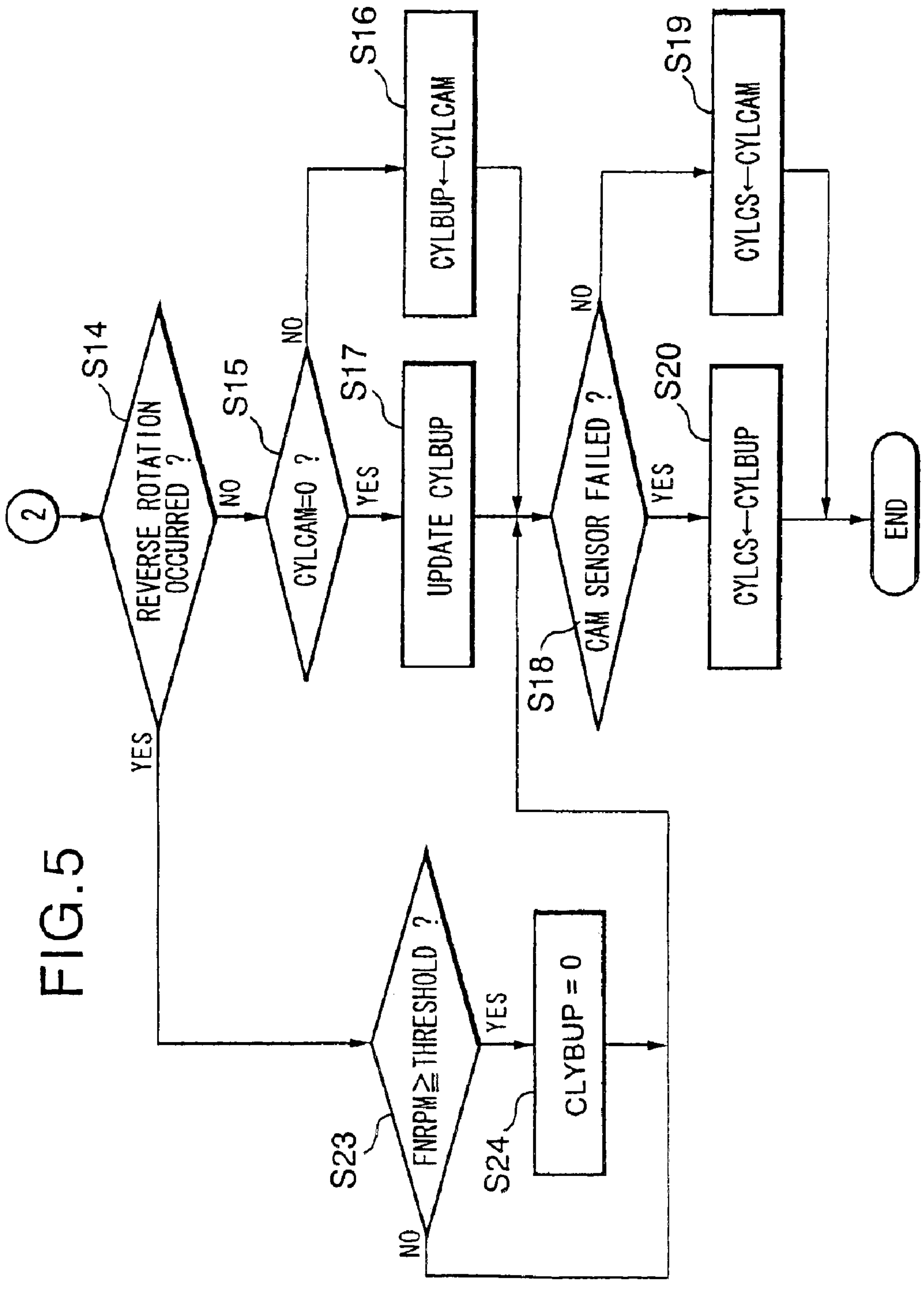
FIG. 5 is a flowchart showing a cylinder discrimination process in the embodiment of the present invention shown in FIG. 1.

A program shown in flowcharts of FIG. 3 to FIG. 5 is the one interruptedly executed at each generation of position signal POS, in detail, at each trailing of position signal POS.

At step S1, a period of time from the trailing to next trailing of position signal POS is measured, to measure a generation period TPOS of position signal POS.

At step S2, a periodic ratio TPOSCP between a most newly measured period TPOS and a previously measured TPOSz is calculated.

$$TPOSCP=TPOS/TPOSz$$

At step S3, it is judged whether or not periodic ratio TPOSCP exceeds a threshold A.

Thereby, it is judged whether or not the most newly measured period TPOS is a result of measuring the portion of no position signal POS.

If periodic ratio TPOSCP is threshold A or above, it is judged that most newly measured period TPOS is the result of measuring the portion of no position signal POS, and control proceeds to step S4.

At step S4, 1 is set to non-signal detection flag Fnu.

On the other hand, when it is judged at step S3 that periodic ratio TPOSCP is less than threshold A, and most newly measured period TPOS is a result of measuring a portion other than the portion of no position signal POS, control proceeds to step S5.

At step S5, it is judged whether or not non-signal detection flag Fnu is 1.

If it is the time when position signal POS is generated immediately after the portion of no position signal POS has been measured, it is judged that Fnu=1, here.

If it is judged at step S5 that Fnu=1, control proceeds to step S6.

At step S6, flag Fnu is reset to 0, and at next step S7, a counted value CRACNT of position signal POS is reset to 0.

On the other hand, when flag Fnu is set to 1 at step S4, and also when it is judged at step S5 that flag Fnu is 0, control proceeds to step S8.

At step S8, counted value CRACNT is counted up by 1.

As shown in FIG. 2, counted value CRACNT is counted up at each time when position signal POS is generated, but is reset to 0 at the time when position signal POS is generated immediately after a period of the portion of no position signal POS is measured.

When counted value CRACNT is counted up at step S8, control proceeds to step S9.

At step S9, it is judged whether or not counted value CRACNT reaches 7.

As shown in FIG. 2, CRACNT=7 indicates that a reference piston position is achieved for performing cylinder discrimination.

Therefore, when counted value CRACNT=7, control proceeds to step S10 in order to perform the cylinder discrimination.

At step S10, it is judged whether or not present cylinder discrimination timing is second timing or thereafter.

Then, when it is first cylinder discrimination timing, control proceeds to step S11 where 0 indicating cylinder unknown is set to a cylinder discrimination value CYLCAM based on cylinder discriminating signal PHASE.

If cylinder discrimination timing is the second timing or thereafter, control proceeds to step S12.

Figure 7:
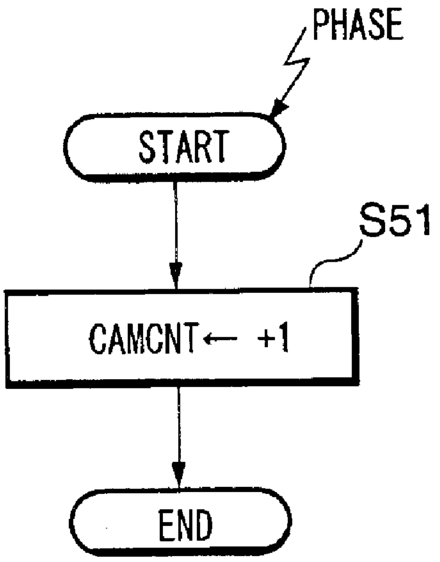
FIG. 7 is a flowchart showing a counting process of cylinder discriminating signal in the embodiment of the present invention shown in FIG. 1.

At step S12, cylinder discrimination value CYLCAM is set based on a value of counted value CAMCNT, which is counted up at step S51 in a flowchart of FIG. 7 at each time when cylinder discriminating signal PHASE is generated.

Initial values of counted value CAMCNT and cylinder discrimination value CYLCAM are both 0.

At step S12, when counted value CAMCNT is 0, 0 indicating cylinder unknown is set to cylinder discrimination value CYLCAM.

When counted value CAMCNT is 1, 3 is set to cylinder discrimination value CYLCAM to indicate that next reference crank angle signal REF corresponds to #3 cylinder.

When counted value CAMCNT is 2, 1 is set to cylinder discrimination value CYLCAM to indicate that next reference crank angle signal REF corresponds to #1 cylinder.

When counted value CAMCNT is 3, 4 is set to cylinder discrimination value CYLCAM to indicate that next reference crank angle signal REF corresponds to #4 cylinder.

When counted value CAMCNT is 4, 2 is set to cylinder discrimination value CYLCAM to indicate that next reference crank angle signal REF corresponds to #2 cylinder.

At step 13, counted value CAMCNT is reset to 0.

At step 14 and subsequent steps, a backup cylinder discrimination value CYLBUP is updated.

Backup cylinder discrimination value CYLBUP is RAM data stored even while a key switch is OFF.

First, at step S14, it is judged whether or not a reverse rotation is detected at an engine stop.

Figure 8:
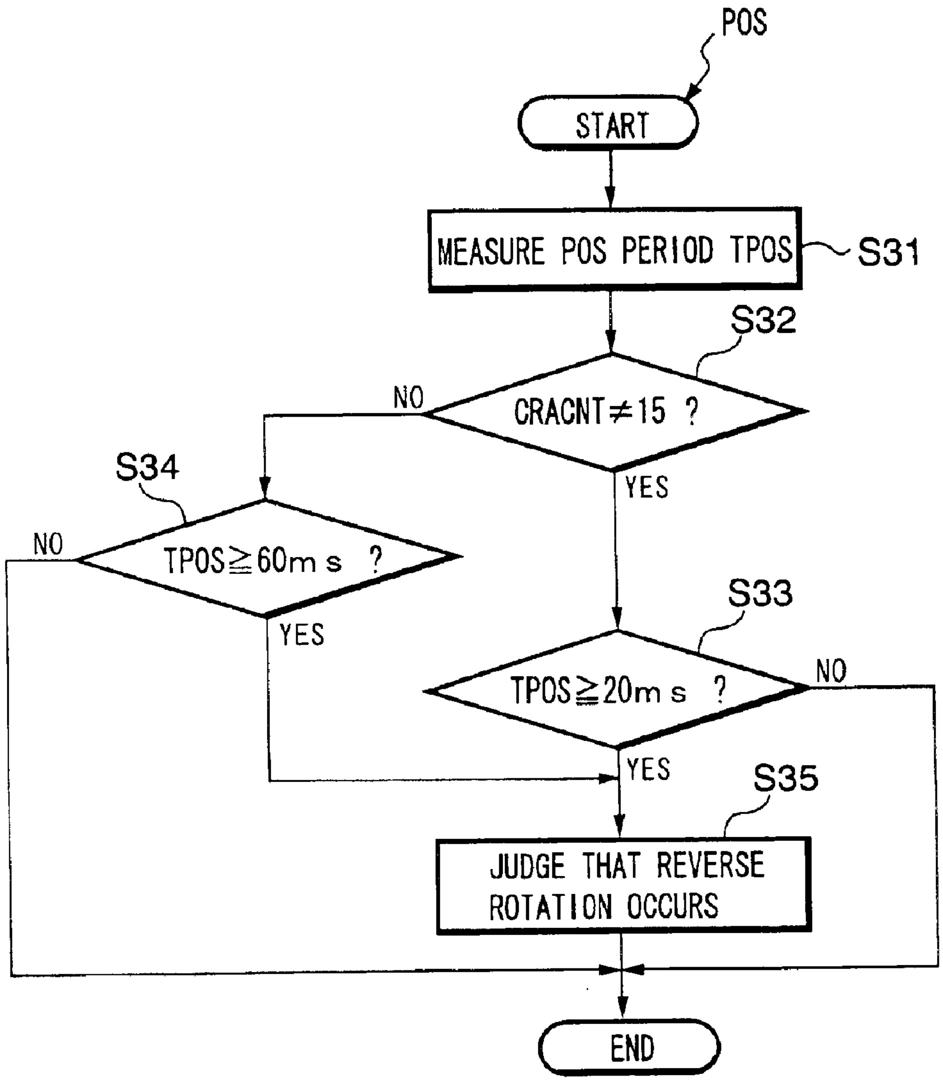
FIG. 8 is a flowchart showing a detection of reverse rotation in the embodiment of the present invention shown in FIG. 1.

A detection process of reverse rotation to be judged at step S14 is executed in accordance with a flowchart of FIG. 8.

The process in the flowchart of FIG. 8 is interruptedly executed at each trailing of position signal POS.

At step S31, generation period TPOS of position signal POS is measured.

Next, at step S32, it is judged whether or not counted value CRACNT is counted up to 15.

When counted value CRACNT is not 15, a presently measured period equals to a period of time required for the engine to be rotated by a normal crank angle 10°.

Therefore, control proceeds to step S33, where it is judged whether or not period TPOS is 20 ms or above.

20 ms is a threshold to be used for detecting the reverse rotation based on period TPOS, and is a normal value to be compared with the period of time required for the engine to be rotated by crank angle 10°.

If period TPOS is the normal value or above, it is judged that period TPOS has become longer due to the reverse rotation of the engine immediately before stopping, which does not occur normally, and control proceeds to step S35, where it is judged that the reverse rotation of the engine occurs.

On the other hand, if counted value CRACNT is counted up to 15, the presently measured period is a result of measuring the portion of no position signal POS.

In this case, control proceeds to step S34, where it is judged whether or not period TPOS is 60 ms or above.

60 ms is a threshold to be used for detecting the reverse rotation of the engine based on the period of the portion of no position signal POS.

If period TPOS is 60 ms or above, it is judged that period TPOS has become longer due to the reverse rotation of the engine immediately before stopping, which does not occur normally.

Then, control proceeds to step S35, where it is judged that the reverse rotation of the engine occurs.

The threshold to be used for detecting the reverse rotation is set to a period of time, which is longer than a maximum value of period TPOS in the case where engine 101 stops without the reverse rotation, and is exceeded by period TPOS only when the reverse rotation occurs.

Note, it is preferable that backup cylinder discrimination value CYLBUP is set to a value retarded to an actual value, even if the judgment of the reverse rotation is failed.

This is because, if backup cylinder discrimination value CYLBUP is set to a value advanced from the actual value, an ignition procedure is performed in an intake stroke.

In the flowchart of FIG. 8, the reverse rotation is detected based on period TPOS. However, it is also possible to detect the reverse rotation based on periodic ratio TPOSCP between present value TPOS and previous value TPOSz of period TPOS.

Figure 9:
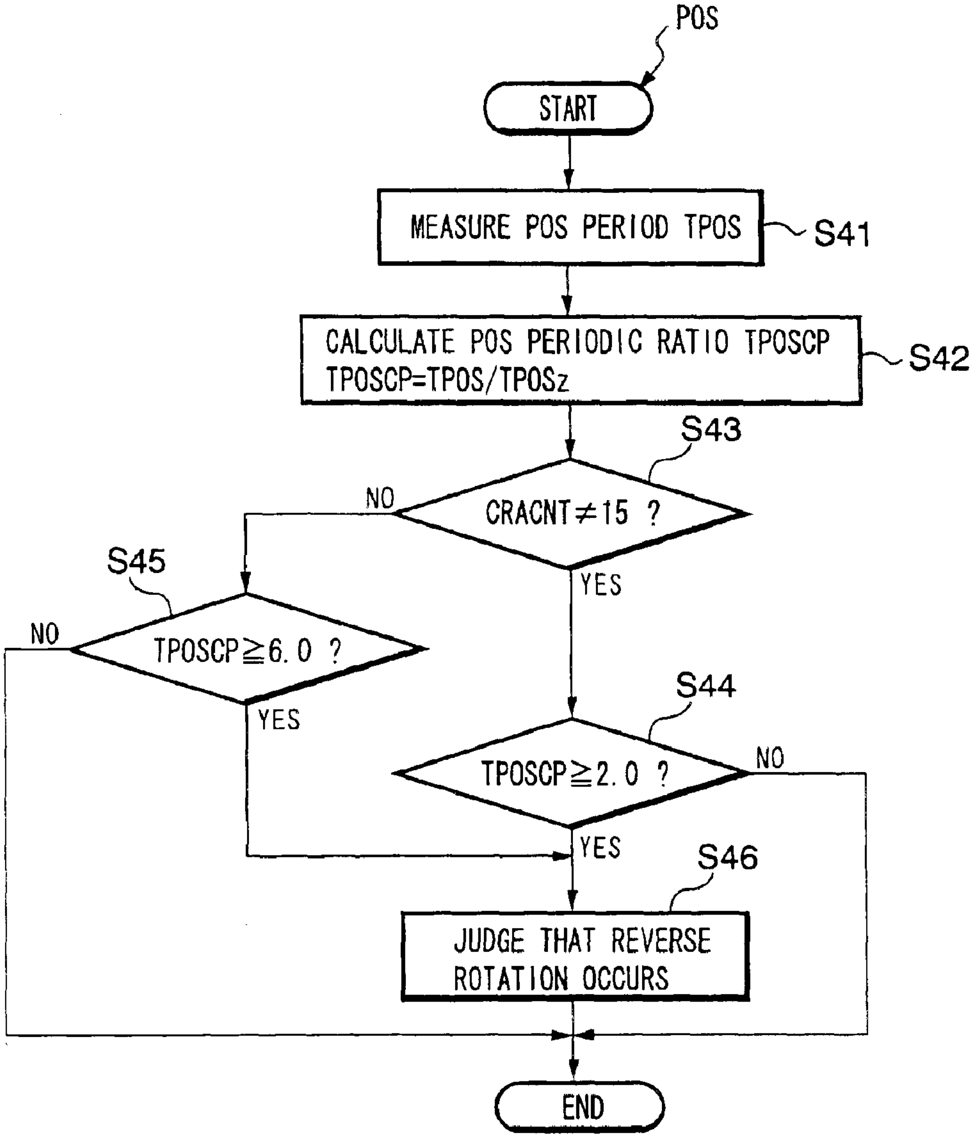
FIG. 9 is a flowchart showing a detection of reverse rotation in the embodiment of the present invention shown in FIG. 1.

A flowchart of FIG. 9 shows an embodiment in which the reverse rotation is detected based on periodic ratio TPOSCP.

The process in the flowchart of FIG. 9 is interruptedly executed at each trailing of position signal POS.

At step S41, generating period TPOS of position signal POS is measured.

At step S42, periodic ratio TPOSCP between presently measured period TPOS and previously measured period TPOSz is calculated.

$$TPOSCP=TPOS/TPOSz$$

At next step S43, it is judged whether or not counted value CRACNT is counted up to 15.

When counted value CRACNT is not 15, the presently measured period equals to a period of time required for the engine to be rotated by a normal crank angle 10°.

In this case, control proceeds to step S44, where it is judged whether or not periodic ratio TPOSCP is 2.0 or above.

2.0 is a threshold to be used for detecting the reverse rotation based on periodic ratio TPOSCP, and is a value normally used.

If periodic ratio TPOSCP is 2.0 or above, it is judged that periodic ratio TPOS has become greater due to the reverse rotation of the engine immediately before stopping, which does not occur normally.

Then, control proceeds to step S46, where it is judged that the reverse rotation of the engine occurs.

On the other hand, if counted value CRACNT is counted up to 15, the presently measured period is a result of measuring the portion of no position signal POS.

In this case, control proceeds to step S45, where it is judged whether or not periodic ratio TPOSCP is equal to or greater than 6.0, which is a threshold greater than a normal value.

If periodic ratio TPOSCP is 6.0 or above, it is judged that periodic ratio TPOSCP has become greater due to the reverse rotation of the engine immediately before stopping, which does not occur normally, and control proceeds to step S46, where it is judged that the reverse rotation of the engine occurs.

The above threshold is set to a value, which is greater than a maximum value of periodic ratio TPOSCP in the case where engine 101 stops without the reverse rotation, and is exceeded by periodic ratio TPOSCP only when the reverse rotation occurs.

Note, it is preferable that backup cylinder discrimination value CYLBUP is set to a value retarded to an actual value, even if the judgment of the reverse rotation has failed.

This is because, if backup cylinder discrimination value CYLBUP is set to a value advanced from the actual value, the ignition procedure is performed in the intake stroke.

Note, the reverse rotation can be detected by identifying between a forward rotation and a reverse rotation.

If it is judged at step S14 that the reverse rotation does not occur at the engine stop, control proceeds to step S15.

At step S15, it is judged whether or not cylinder discrimination value CYLCAM is 0.

If cylinder discrimination value CYLCAM is not 0, control proceeds to step S16, where the value of cylinder discrimination value CYLCAM is set just as it is to backup cylinder discrimination value CYLBUP.

On the other hand, if it is judged at step S15 that cylinder discrimination value CYLCAM is 0, control proceeds to step S17, where a present backup cylinder discrimination value CYLBUP is estimated based on a previous value of backup cylinder discrimination value CYLBUP.

In the four cylinder engine 101 in the present embodiment, if ignition order is #1 cylinder→#3 cylinder→#4 cylinder→#2 cylinder, for example in the case where a previous cylinder discrimination result is #3 cylinder, the present cylinder discrimination result is #4 cylinder in accordance with a pattern of the ignition order.

Therefore, at step S17, present backup cylinder discrimination value CYLBUP is estimated in accordance with the ignition order.

On the other hand, if it is detected at step S14 that the reverse rotation occurs at the engine stop, control proceeds to step S23.

At step S23, it is judged whether or not an engine rotation speed FNRPM obtained based on generation period TPOS of position signal POS is equal to or greater than a threshold set according to cooling water temperature Tw at the time.

Figure 10:
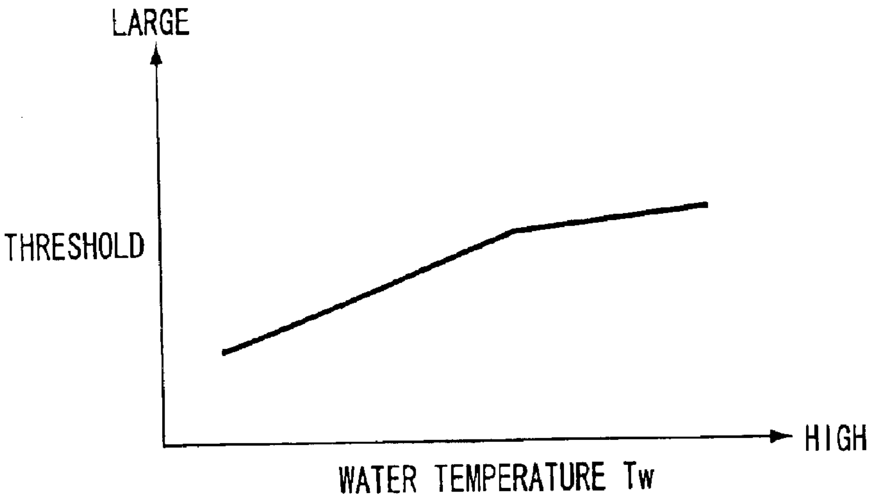
FIG. 10 is a graph showing a correlation between a water temperature and a threshold to be used for burning judgment during the reverse rotation in the embodiment of the present invention shown in FIG. 1.

The above threshold is set to be a smaller value as cooling water temperature Tw is lower and friction is greater, as shown in FIG. 10.

In the case where engine rotation speed FNRPM after the reverse rotation judgment does not reach the threshold or above, control proceeds to step S18, where backup cylinder discrimination value CYLBUP is not updated and held at the previous value.

Thus, even if counted value CRACNT=7 due to the reverse rotation, it is avoided that the update of cylinder discrimination is erroneously executed in accordance with the ignition order.

Accordingly, when the engine is started while cam sensor 120 remains failed, it is possible to perform the cylinder discrimination accurately based on backup cylinder discrimination value CYLBUP.

On the other hand, when engine rotation speed FNRPM reaches the threshold or above after the reverse rotation judgment, it is estimated that fuel is burned during the reverse rotation.

In this case, control proceeds to step S24, where 0 indicating cylinder unknown is set to backup cylinder discrimination value CYLBUP, and thereafter, control proceeds to step S18.

Backup cylinder discrimination value CYLBUP is used for the control for each cylinder, instead of cylinder discrimination value CYLCAM, when cam sensor 120 is failed, as described later.

Accordingly, if 0 is set to backup cylinder discrimination value CYLBUP, when cam sensor 120 is failed, the control for each cylinder based on the cylinder discrimination result is prohibited.

In the case where the fuel is not burned during the reverse rotation, the engine is stopped immediately after rotated in reverse slightly.

Therefore, even if the reference piston position is achieved for performing the cylinder discrimination with the reverse rotation, backup cylinder discrimination value CYLBUP is not updated, so that backup cylinder discrimination value CYLBUP of when the engine is stopped can be set to a correct value.

However, if the fuel is burned during the reverse rotation, since the engine rotation speed is increased, the engine continues to rotate for a while. Accordingly, backup cylinder discrimination value CYLBUP at the engine stop cannot be set to the correct value.

Therefore, if the fuel is burned during the reverse rotation, backup cylinder discrimination value CYLBUP is set to 0, to avoid that the fuel injection or the ignition is controlled for each cylinder based on an erroneous cylinder discrimination result.

According to the present embodiment, even if the reverse rotation occurs, in the case where the fuel is not burned, it is possible to set backup cylinder discrimination value CYLBUP to the correct value.

Accordingly, the fuel injection or the ignition can be correctly controlled from the cylinder discrimination result based on backup cylinder discrimination result CYLBUP, thereby ensuring controllability at the time when cam sensor 120 is failed.

Further, since the threshold to be used for judging based on the engine rotation speed whether or not the fuel is burned, is set according to cooling water temperature Tw, it is possible to judge with high accuracy as to whether or not the fuel is burned corresponding to a difference between friction.

In the above description, the constitution is such that whether or not the fuel is burned is judged based on the engine rotation speed after the reverse rotation. However, since the crankshaft is excessively rotated due to the fuel burning, it is also possible to judge, based on a rotation angle of the engine after the reverse rotation, whether or not the fuel is burned.

Figure 6:
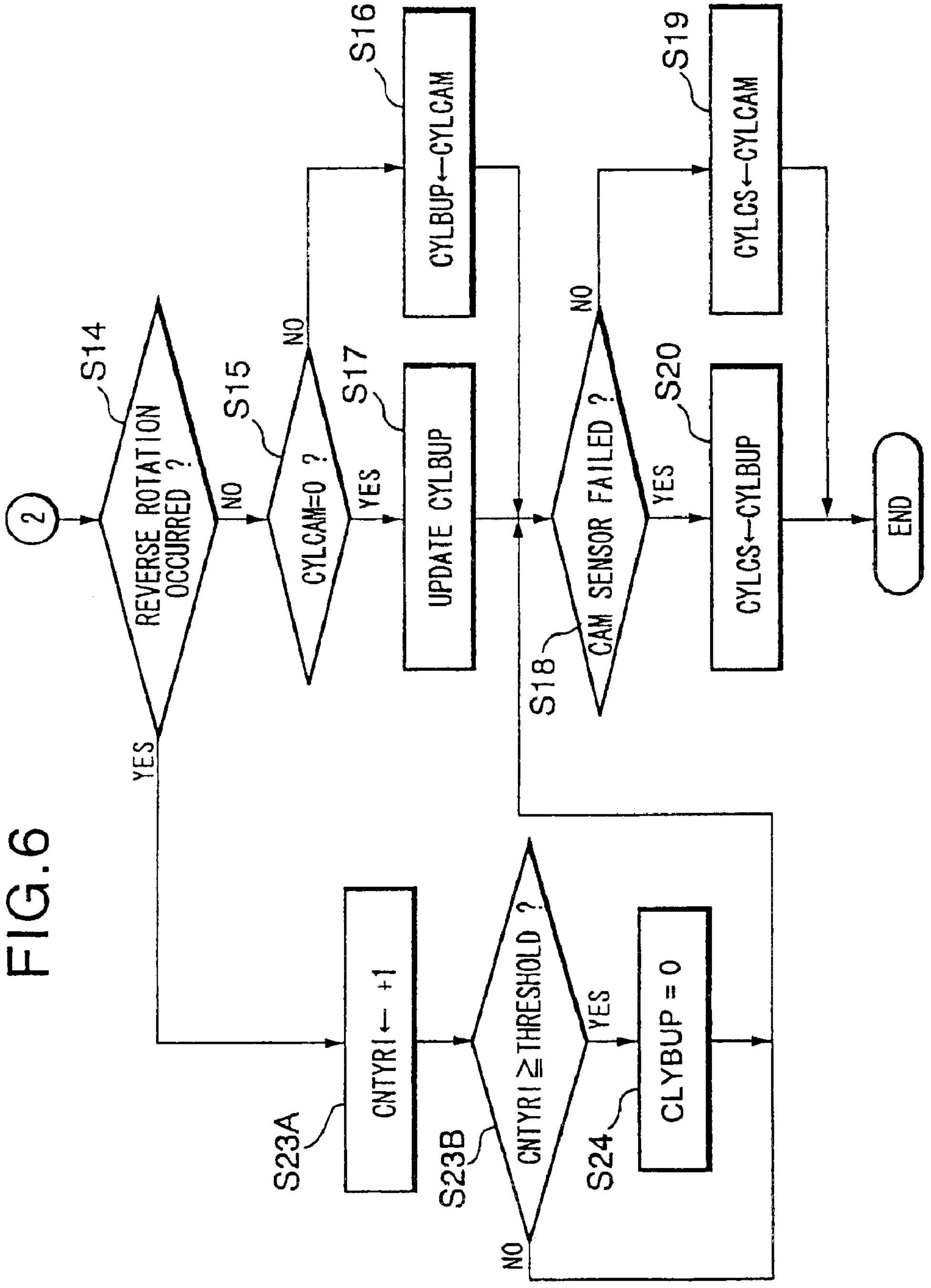
FIG. 6 is a flowchart showing a burning judgment process during a reverse rotation in the embodiment of the present invention shown in FIG. 1.

A flowchart of FIG. 6 shows an embodiment in which whether or not the fuel is burned is judged based on the rotation angle of the engine after the reverse rotation judgment.

In the flowchart of FIG. 6, if it is judged at step S14 that the reverse rotation occurs, control proceeds to step S23A.

At step S23A, a counter CNTYRI for counting the frequency of generation of position signal POS after the reverse rotation judgment is counted up.

Then, at next step S23B, it is judged whether or not a value of counter CNTYRI is equal to or greater than a threshold set according to cooling water temperature Tw at the time.

The above threshold is set to be a smaller value as cooling water temperature Tw is lower and the friction is greater.

Then, if the value of counter CNTYRI reaches a judgment value or above, in other words, if the engine rotation angle after the reverse rotation judgment reaches a predetermined angle or above, it is judged that the fuel is burned during the reverse rotation, and control proceeds to step S24.

At step S24, 0 indicating cylinder unknown is set to backup cylinder discrimination value CYLBUP, and thereafter, control proceeds to step S18.

On the other hand, in the case where the value of counter CNTYRI does not reach the judgment value or above after the reverse rotation judgment, control proceeds to step S18, where backup cylinder discrimination value CYLBUP is not updated and held at the previous value.

Note, the fuel burning during the reverse rotation occurs, for example in the case where cranking is stopped before the engine start.

Therefore, the constitution may be such that, in the case of a high operating condition as described above in which there is a high possibility that the fuel is burned during the reverse rotation, 0 is set to backup cylinder discrimination value CYLBUP at the engine stop.

At step S18, it is judged whether or not cam sensor 120 is failed.

The failure of cam sensor 120 means a state where cylinder discriminating signal PHASE is not generated due to for example, disconnection.

The disconnection may be judged based on potential of a signal line of cam sensor 120 or based on that there is continued a state in which cylinder discriminating signal PHASE is not generated at all between cylinder discrimination timing.

When it is judged at step S18 that cam sensor 120 is normal, control proceeds to step S19.

At step S19, the value of cylinder discrimination value CYLCAM set based on cylinder discriminating signal PHASE is set to a control purpose cylinder discrimination value CYLCS.

When it is judged at step S18 that cam sensor 120 is failed, control proceeds to step S20.

At step S20, the value of backup cylinder discrimination value CYLBUP is set to control purpose cylinder discrimination value CYLCS.

When it is judged at step S9 that counter value CRACNT is not 7, control proceeds to step S21, where it is judged whether counter value CRACNT=11.

CRACNT=11 is set as generation timing of reference crank angle signal REF.

If it is judged at step S21 that counter value CRACNT=11, control proceeds to step S22, where reference crank angle signal REF is generated.

The above reference crank angle signal REF indicates a reference crank angle position being a reference for measuring the ignition timing or the fuel injection timing.

Then, based on control cylinder discrimination value CYLCS of when reference crank angle signal REF is generated, the ignition timing or the fuel injection timing in a corresponding cylinder is set.

When control cylinder discrimination value CYLCS is 0, since the corresponding cylinder is unknown, the fuel injection or the ignition procedure is stopped.

Note, a crank angle sensor may be disposed for taking out, separately from position signal POS, reference crank angle signal from crankshaft.

Further, although the cooling water temperature is used as a parameter representing the engine temperature in the present embodiment, a temperature of lubricating oil and the like may be used as the parameter.

Moreover, cylinder discriminating signal PHASE may be of a constitution to indicate the cylinder based on pulse widths different from each other, in addition to the constitution to indicate the cylinder based on the number of pulses.

The entire contents of Japanese Patent Application No. 2002-212974, filed Jul. 22, 2002, a priority of which is claimed, are incorporated herein by reference.

While only selected embodiments have been chosen to illustrate the present invention, it will be apparent to those skilled in the art from this disclosure that various chances and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A control apparatus of an engine comprising:

a crank angle detector detecting a reference crank angle for each stroke phase difference between cylinders; and a control unit that receives a detection signal of said crank angle detector, updates a cylinder discrimination value based on a previous cylinder discrimination value, and outputs a control signal for each cylinder based on said cylinder discrimination value, wherein said control unit is arranged to detect a reverse rotation of said engine, wherein said control unit is configured to detect whether fuel in said engine is burned during the reverse rotation of the engine, and wherein said control unit prohibits the outputting of said control signal for each cylinder based on said cylinder discrimination value, upon detection of burning of the fuel during the reverse rotation of said engine.

2. A control apparatus of an engine according to claim 1, further comprising:

a unit crank angle detector outputting a detection signal at each unit crank angle, wherein said control unit measures a period of detection signal from said unit crank angle detector, and detects the reverse rotation of said engine based on a change in said period.

3. A control apparatus of an engine according to claim 2, wherein said control unit detects the reverse rotation of said engine based on a ratio between the newest value and a previous value of said period.

4. A control apparatus of an engine comprising:

a crank angle detector detecting a reference crank angle for each stroke phase difference between cylinders;

a control unit that receives a detection signal of said crank angle detector, updates a cylinder discrimination value based on a previous cylinder discrimination value, and outputs a control signal for each cylinder based on said cylinder discrimination value; and a rotation speed detector detecting a rotation speed of said engine, wherein said control unit prohibits the outputting of said control signal for each cylinder based on said cylinder discrimination value, when said engine is rotated in reverse and also fuel is burned in said engine during said reverse rotation, and wherein said control unit judges that the fuel is burned, when the rotation speed of said engine detected by said rotation speed detector during the reverse rotation of said engine reaches a threshold or above.

5. A control apparatus of an engine according to claim 4, further comprising:

an engine temperature detector detecting a temperature of said engine, wherein said control unit sets said threshold based on the temperature of said engine detected by said engine temperature detector.

6. A control apparatus of an engine comprising:

a crank angle detector detecting a reference crank angle for each stroke phase difference between cylinders;

a control unit that receives a detection signal of said crank angle detector, updates a cylinder discrimination value based on a previous cylinder discrimination value, and outputs a control signal for each cylinder based on said cylinder discrimination value; and a rotation angle detector detecting a rotation angle of said engine, wherein said control unit prohibits the outputting of said control signal for each cylinder based on said cylinder discrimination value, when said engine is rotated in reverse and also fuel is burned in said engine during said reverse rotation, and wherein said control unit judges that the fuel is burned, when the rotation angle of said engine detected by said rotation angle detector during the reverse rotation of said engine reaches a threshold.

7. A control apparatus of an engine according to claim 6, further comprising:

an engine temperature detector detecting a temperature of said engine, wherein said control unit sets said threshold based on the temperature of said engine detected by said engine temperature detector.

8. A control apparatus of an engine according to claim 1, wherein said control unit stops the update of said cylinder discrimination value when said engine is rotated in reverse.

9. A control apparatus of an engine comprising:

a crank angle detector detecting a reference crank angle for each stroke phase difference between cylinders;

a control unit that receives a detection signal of said crank angle detector, updates a cylinder discrimination value based on a previous cylinder discrimination value, and outputs a control signal for each cylinder based on said cylinder discrimination value; and a cylinder discriminating signal output device outputting a cylinder discriminating signal at each reference crank angle, wherein said control unit prohibits the outputting of said control signal for each cylinder based on said cylinder discrimination value, when said engine is rotated in reverse and also fuel is burned in said engine during said reverse rotation, and wherein said control unit switches from the update process of cylinder discrimination value based on the cylinder discriminating signal output from said cylinder discriminating signal output device to the update process of cylinder discrimination value based on the previous cylinder discrimination value, when judging a failure of said cylinder discriminating signal output device.

10. A control apparatus of an engine, comprising:

crank angle detecting means for detecting a reference crank angle for each stroke phase difference between cylinders;

cylinder discrimination value updating means for updating a cylinder discrimination value based on a previous cylinder discrimination value, at each time when said reference crank angle is detected by said crank angle detecting means;

control means for outputting a control signal for each cylinder based on said cylinder discrimination value;

reverse rotation detecting means for detecting a reverse rotation of said engine;

burning detecting means for detecting whether or not fuel is burned during said reverse rotation of said engine detected by said reverse rotation detecting means; and control for each cylinder prohibiting means for prohibiting the outputting of control signal for each cylinder based on said cylinder discrimination value by said control means, when it is detected by said burning detecting means that the fuel is burned in said engine during the reverse rotation.

11. A control method of an engine, comprising the steps of:

detecting a reference crank angle for each stroke phase difference between cylinders;

updating a cylinder discrimination value based on a previous cylinder discrimination value, at each time when said reference crank angle is detected;

outputting a control signal for each cylinder based on said cylinder discrimination value;

detecting a reverse rotation of said engine;

detecting the burning of fuel during said reverse rotation of said engine; and prohibiting the outputting of control signal for each cylinder based on said cylinder discrimination value, when the fuel is burned in said engine during the reverse rotation.

12. A control method of an engine according to claim 11, wherein said step of detecting the reverse rotation of said engine comprises the steps of:

outputting a detection signal at each unit crank angle;

measuring a period of detection signal at each unit crank angle; and detecting the reverse rotation of said engine based on a change in said period.

13. A control method of an engine according to claim 12, wherein said step of detecting the reverse rotation of said engine based on the change in said period comprises the steps of:

calculating a ratio between the newest value and a previous value of said period; and detecting the reverse rotation of said engine based on a result of comparison between said ratio and a threshold.

14. A control method of an engine according to claim 11, wherein said step of detecting the burning of fuel during the reverse rotation of said engine comprises the steps of:

detecting a rotation speed of said engine; and judging that the fuel is burned, when the rotation speed of said engine reaches a threshold or above.

15. A control method of an engine according to claim 11, wherein said step of detecting the burning of fuel during the reverse rotation of said engine comprises the steps of:

detecting a temperature of said engine;

setting a threshold based on the temperature of said engine;

detecting a rotation speed of said engine; and judging that the fuel is burned, when the rotation speed of said engine reaches said threshold or above.

16. A control method of an engine according to claim 11, wherein said step of detecting the burning of fuel during the reverse rotation of said engine comprises the steps of:

detecting a rotation angle of said engine; and judging that the fuel is burned, when the rotation angle of said engine reaches a threshold.

17. A control method of an engine according to claim 11, wherein said step of detecting the burning of fuel during the reverse rotation of said engine comprises the steps of:

detecting a temperature of said engine;

setting a threshold based on the temperature of said engine;

detecting a rotation angle of said engine during the reverse rotation of said engine; and judging that the fuel is burned, when said rotation angle reach said threshold or above.

18. A control method of an engine according to claim 11, further comprising the step of;

stopping the update of said cylinder discrimination value when said engine is rotated in reverse.

19. A control method of an engine according to claim 11, further comprising the steps of:

outputting a cylinder discriminating signal at each reference crank angle;

updating a cylinder discrimination value at each reference crank angle based on said cylinder discriminating signal;

judging an abnormality of said cylinder discriminating signal;

prohibiting the update process of cylinder discrimination value based on said cylinder discriminating signal; and switching to the update process of cylinder discrimination value based on a previous cylinder discrimination value, when the update process of cylinder discrimination value based on said cylinder discriminating signal is prohibited.

* * * * *